United States Patent
Sear et al.

[15] 3,655,973
[45] Apr. 11, 1972

[54] RADIO-ISOTOPE SCANNING MACHINE FOR MORE CLEARLY REPRESENTING CONTOURS OF EQUAL RADIATION INTENSITY

[72] Inventors: Reginald Sear, London; Peter Mervyn Dean, Ealing, both of England

[73] Assignee: National Research Development Corporation, London, England

[22] Filed: June 18, 1969

[21] Appl. No.: 834,468

[30] Foreign Application Priority Data
June 19, 1968 Great Britain.....................29,130/68

[52] U.S. Cl.....................................250/71.5 S, 250/71.5 R
[51] Int. Cl..........................................................G01t 1/20
[58] Field of Search...........................................250/71.5 S

[56] References Cited
UNITED STATES PATENTS

| | | |
|---|---|---|
| 3,303,508 | 2/1967 | Jaffe et al.......................250/71.5 S X |
| 3,322,954 | 5/1967 | Bell et al........................250/71.5 S X |
| 3,509,341 | 4/1970 | Hindel et al. ......................250/71.5 S |

*Primary Examiner*—Archie R. Borchelt
*Attorney*—Cushman, Darby & Cushman

[57] ABSTRACT

A radio-isotope scanning machine provides a photoscan of a field of interest which contains contour lines representing levels of equal intensity of radiation. Between each contour line the density of the display can vary from zero to a maximum, or alternatively, the photo display can vary from zero to a maximum throughout the full range of measured intensity of radiation and regions of low or zero density can be introduced at predetermined levels.

6 Claims, 4 Drawing Figures

RADIO-ISOTOPE SCANNING MACHINE FOR MORE CLEARLY REPRESENTING CONTOURS OF EQUAL RADIATION INTENSITY

This invention relates to radio-isotope scanning machines.

Such machines indicate the spatial distribution of concentrations of radio-active isotopes within a field of interest. Frequently the field of interest is an organ within a human patient undergoing diagnostic procedures for medical purposes. The field of interest is scanned by means of a detector which carries out a movement which normally comprises a series of lines in a raster-like pattern. At each successive point in the scanning motion the detector receives radiation from a small area in the field. The detected radiation is converted into an electrical impulse, the magnitude of which is related to the intensity of detected radiation from that area, and this impulse is then used to activate a visual display in a manner such that corresponding areas in the display to the areas being scanned vary in a visually recognizable way as the intensity of the received radiation varies.

Various techniques are known by which visual displays analogous to the variation in radiation level over the field can be produced. One such technique is known as color scanning and another as photoscanning. In color scanning the variations in the level of radiation that the detector receives as it scans the field is displayed as a series of color changes on the display. In other words, a number of colors are provided and the marking of any one of these colors at a particular point in the display indicates that at the corresponding point in the field of interest there is a level of radiation within a sub-range corresponding to that color. The resulting display is a multicolored "map" of the field of interest. In photoscanning, variations in the level of radiation are displayed as changes in the density of photosensitive film, which may be a standard X-ray film, which has been exposed to a collimated light beam from a source controlled by the output from the detector. The resulting display will comprise a "picture" of varying density corresponding to the varying radiation levels from the field being scanned.

Whatever the type of display that is employed the purpose is to enable the eye to distinguish between regions corresponding to different levels of radiation. The boundaries between such regions are contour lines of equal radiation level. The ability of the eye to discern features of diagnostic significance depends on the extent to which such boundaries are discernable. In the case of color scans these boundaries divide regions of different color, in the case of photoscans they divide regions of different film density.

It is an object of the invention to provide a display in which the boundaries between different regions are more readily discernable.

According to the present invention a radio-isotope scanning machine comprises means for detecting the level of radiation from small elemental areas in a field of interest, means for scanning over the field of interest, a visible display, means for converting the detected radiation to marks on the display at positions corresponding to the elemental areas in the field, the densities of the marks being related to the levels of radiation and there being discontinuous changes in the densities of the marks at a plurality of different predetermined levels of radiation.

In carrying out the invention the discontinuous changes preferably comprise decreases in the densities of the marks at said predetermined levels.

In one embodiment of the invention the detectable range of levels of radiation comprises a plurality of different sub-ranges and the variation of the density of the marks within each of the sub-ranges varies from zero to maximum.

In an alternative embodiment the marks vary in density from zero to maximum over the full range of levels of detectable radiation and the said changes in densities of the marks are to zero or low values at the predetermined levels.

In order that the invention may be more fully understood reference will now be made to the accompanying drawings in which.

Figure 1:
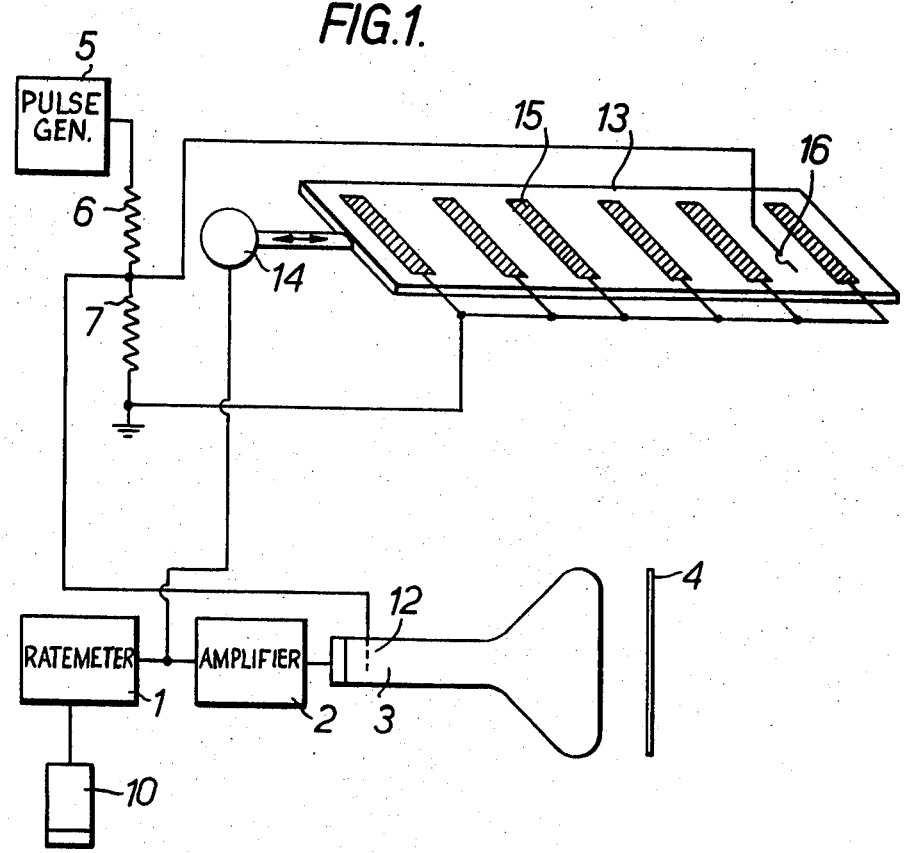
FIG. 1 illustrates one embodiment of the invention.

Referring now to FIG. 1 there is shown therein a radio-isotope scanning machine which comprises a radiation detector 10 which is caused to scan over a field of interest which may, for example, be an organ in a human patient. The detector converts the received photons of radiation into a series of electrical impulses, the rate at which the impulses occur being proportional to the intensity of the radiation from the source. These impulses are counted in a rate meter 1 which produces an output the magnitude of which is proportional to the input count rate. This output is amplified by amplifier 2 to a suitable value and applied as the EHT voltage to a cathode ray tube 3 such that the intensity of the electron beam generated in tube 3 depends on the magnitude of the EHT voltage. Cathode ray tube 3 is moved bodily in synchronism with the movement of radiation detector 10 so that the position of the tube corresponds at any instant to the position of the radiation detector over the patient. The light output from the face of cathode ray tube 3 is photographed on a suitable medium 4 which acts at the visual display. Instead of bodily movement of tube 3, the beam may be deflected electronically.

Cathode ray tube 3 is arranged so that the EHT voltage by itself is not sufficient to produce a beam but a beam is generated only when brightening pulses are applied to a grid 12 of the cathode ray tube. These brightening pulses are obtained from a pulse generator 5 which produces pulses at a constant rate. The pulse output from pulse generator 5 is applied through a potential divider chain comprising resistors 6 and 7 to which the control grid 12 of cathode ray tube 3 is connected.

Figure 2:
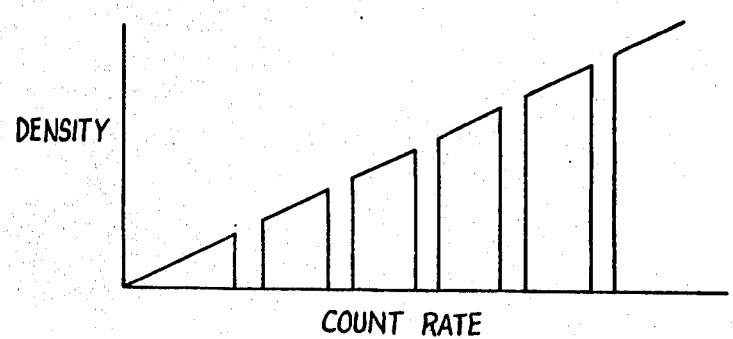
FIG. 2 is a diagram of the relationship between display density and count rate obtained with the machine of FIG. 1.

The apparatus thus far described is arranged so that the density of the display varies from zero to a maximum value corresponding to variations over a selected part of the range of the radiation detected in detector 10 from a selected low level to selected high level. However, in order to increase the ability to visualize the display discontinuous changes in the densities of the marks are introduced at a plurality of different predetermined levels of radiation. This is achieved by providing a mechanical slide 13 which can be moved to and fro by means of a servo system 14, the input signal to which is derived from rate meter 1. Slide 13 has an insulating surface and carries on it a series of conductive bands 15 which are all earthed. Bearing on the slide is a wiper 16 which is connected to control grid 12 of cathode ray tube 3. It will be seen that when wiper 16 bears on any of the insulating portions of slide 13 then there will be no effect on the cathode ray tube, however, whenever the wiper makes contact with one of the conducting bands 15 due to the sideways movement of the slide under the control from the signal of rate meter 1 then control grid 12 of the cathode ray tube 3 is earthed and the beam is momentarily interrupted. This has the effect of cutting off the beam and reducing the density of the marks on the display to zero. The resulting relationship between count rate and density is shown in FIG. 2 wherein it will be seen that the steadily rising line corresponds to the increase in EHT voltage as the count rate increases while at a number of predetermined levels corresponding to the levels at which wiper 13 makes contact with any of the bands 12, the density becomes reduced to zero over a value of count rate depending on the widths of the conducting bands.

The resulting display thus has a series of contour lines which considerably aids the interpretation of the display and the density of the display at any point is related to the intensity of the radiation at that point.

Figure 3:
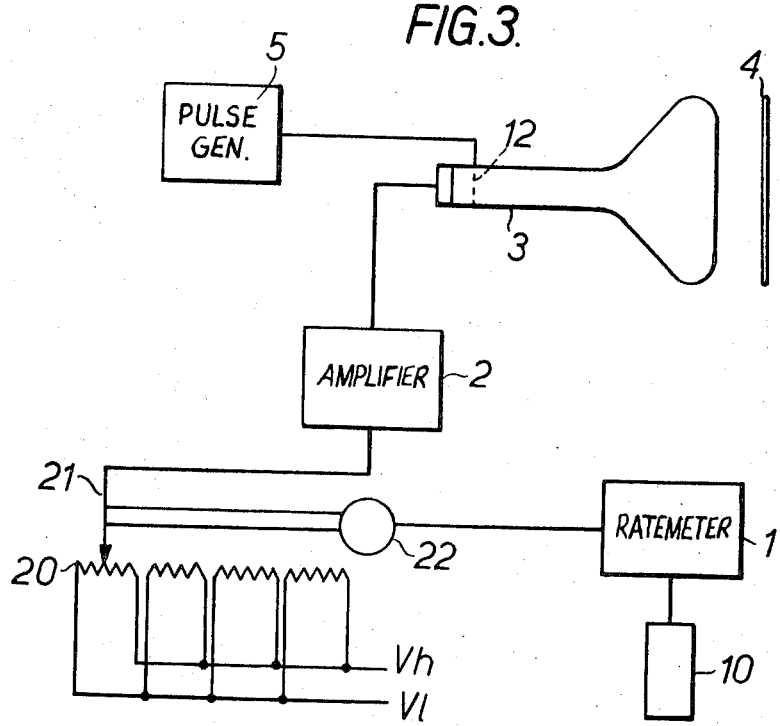
FIG. 3 illustrates an alternative embodiment of the invention.

FIG. 3 shows an alternative embodiment of the invention in which like parts have like reference numerals to FIG. 1 and it will be seen that in this arrangement pulse generator 5 is directly connected to the control grid of cathode ray tube 3 so that a steady stream of brightening pulses is maintained. However, in this arrangement the EHT voltage is not derived directly from the signal obtained from rate meter 1 but instead is obtained from one of a series of potentiometers 20 over which a slider 21 can move in succession. Slider 21 is controlled by means of a servocontrol 22 similar to the servo 14 in FIG. 1 and which, like the servo in FIG. 1, is controlled by the signal from rate meter 1.

Figure 4:
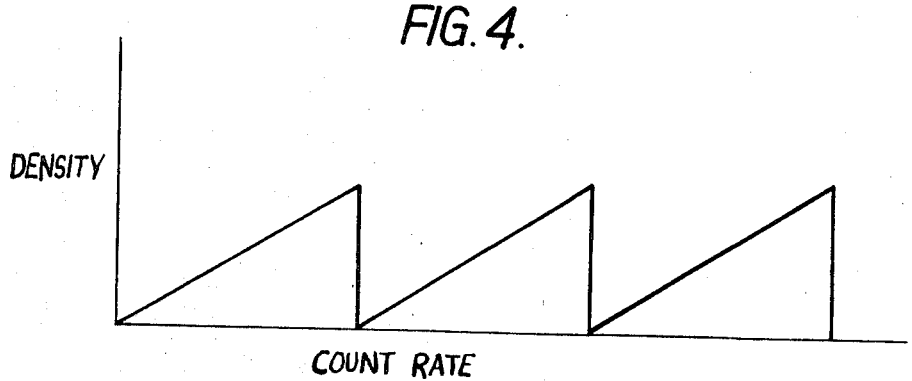
FIG. 4 is a diagram of the relationship between density and count rate obtained with the machine of FIG. 3.

In the arrangement of FIG. 3 similar ends of all the potentiometers are connected to a low voltage Vl while the other ends of the potentiometers are connected to a high voltage Vh. With the arrangement shown in FIG. 3 the relationship between count rate and display density is as shown in FIG. 4 where it will be seen that the overall range of count rates which can be detected is divided into a series of sub-ranges and the density in each of the sub-ranges varies from zero represented by the voltage Vl to a maximum represented by the voltage Vh. The number of such sub-ranges will depend on the number of potentiometers provided in the potentiometer strip 20.

The arrangement of FIG. 3, like the arrangement of FIG. 1, will produce a display which has a series of contours which appreciably aid in diagnosis. However with this arrangement the density of the film at any point is related to the intensity of radiation within a sub-range only. This has the advantage that the total range of densities in the photographic medium is available to represent each sub-range, instead of only once over the whole range, thus considerably increasing the sensitivity.

As a modification to the arrangement of FIG. 3 instead of connecting the potentiometers to a common low voltage Vl and a common high voltage Vh they can each be connected to different voltages and the lower voltages of each successive potentiometer can be set at increasingly higher values and similarly the higher voltages of each potentiometer can be connected to successive greater value of voltage. By this means the densities within each sub-range can be distinguished from each other since the densities at lower sub-ranges will be less than at higher sub-ranges. This has the advantage of combining features of both of the previously described arrangements.

While in the above described arrangements mechanical methods are described by which movement is produced by a servomechanism operated by signals from the rate meter, it will be understood that similar effects can be obtained by electronic means.

We claim:
1. A radio-isotope scanning machine comprising:
    detector means for detecting the level of radiation from small elemental areas in a field of interest,
    means for scanning the detector means over the field of interest,
    a visible display,
    means for converting the detected radiation to marks on the display at positions corresponding to the elemental areas in the field, the densities of the marks being related to the levels of radiation, and
    means for producing discontinuous changes in the densities of the marks at a plurality of different predetermined levels of radiation to more clearly delineate contours of equal radiation levels.
2. The machines as claimed in claim 1 in which said discontinuous changes comprise decreases in the densities of the marks at said predetermined levels.
3. The machine as claimed in claim 1 in which the detectable range of levels of radiation comprises a plurality of different sub-ranges and the variation of the density of the marks within each sub-range varies from zero to maximum.
4. The machine as claimed in claim 1 in which the marks vary in density from zero to maximum over the full range of levels of radiation.
5. The machine as claimed in claim 1 in which said changes in the densities of the marks is to zero.
6. The machine as claimed in claim 1 in which the changes in densities of the marks is to values depending on the levels at which said changes occur.

* * * * *